Jan. 26, 1937. V. W. KLIESRATH 2,068,954
CONTROL MECHANISM
Filed Aug. 13, 1934
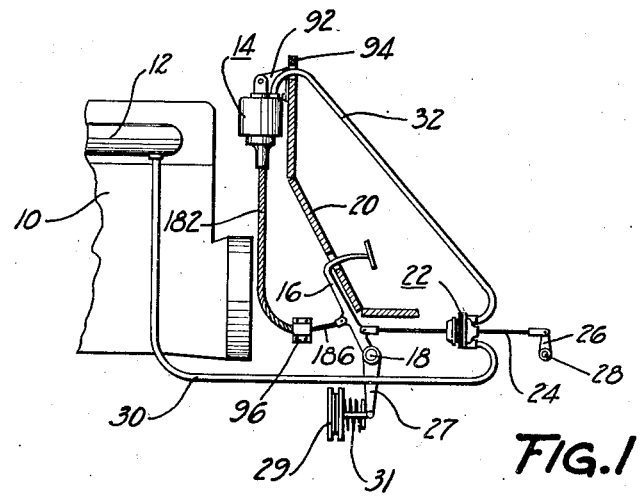
FIG.1
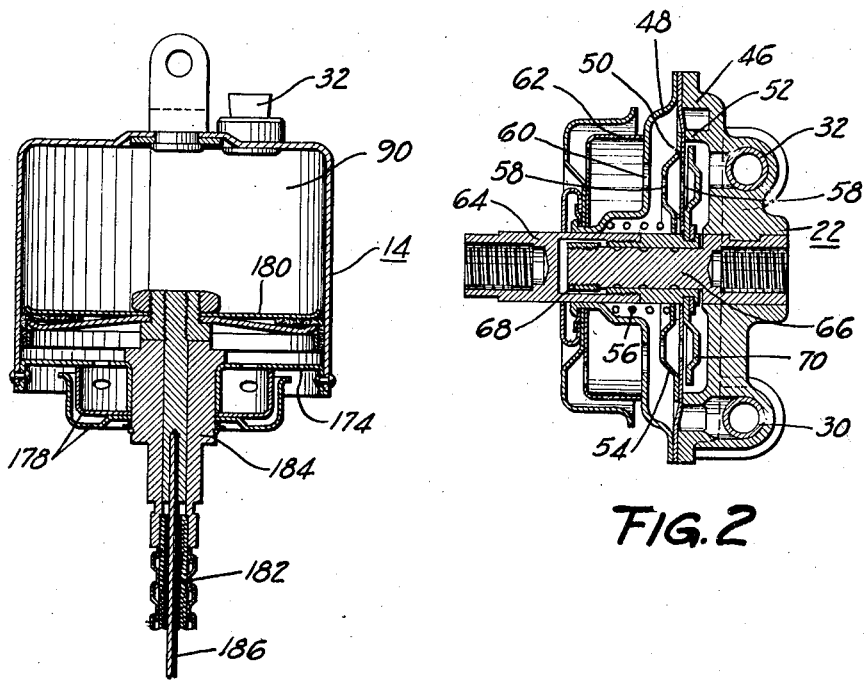
FIG.2
FIG.3
INVENTOR.
VICTOR W. KLIESRATH
BY H. O. Clayton
ATTORNEY Patented Jan. 26, 1937

2,068,954

UNITED STATES PATENT OFFICE 2,068,954

CONTROL MECHANISM

Victor W. Kliesrath, South Bend, Ind., assignor to Bragg-Kliesrath Corporation, South Bend, Ind., a corporation of Indiana Application August 13, 1934, Serial No. 739,623

1 Claim. (Cl. 192—13)

This invention relates to power actuators of the differential fluid pressure actuated type, and is illustrated as embodied in a novel vacuum actuated device to assist in the operation of the brake and in holding the clutch of an automotive vehicle.

An object of the invention is to provide a simple and effective power device, in which all the moving parts are enclosed and protected, and which is adapted for universal use with a minimum of designing and experimenting.

My invention therefore contemplates the use of a novel power cylinder having a closure at its end to which is secured a conduit, preferably a flexible Bowden type conduit. Within the cylinder is a power member such as a piston or its equivalent, to which is connected one end of a tension element extending through the closure and into and through the conduit, the other end being connected to assist in the operation of the brake or clutch.

Another object of the invention is the provision of a single-ended cylinder mounted upon the dashboard of the vehicle and operably connected to assist in the application of the brake and clutch pedal by a Bowden cable control.

The above and other objects and advantages of this invention will be apparent from the following detailed description, together with the illustrative embodiment thereof, shown in the accompanying drawing, which is submitted for purposes of illustration only and is not intended to define the scope of the invention, reference being had for that purpose to the subjoined claim.

In the drawing, wherein similar reference characters refer to similar parts throughout the several views:

Figure 1 is a diagrammatic sectional view of a portion of an automotive vehicle equipped with a device of the present invention;

Figure 2 is a longitudinal sectional view of the valve member shown in Figure 1; and Figure 3 is a longitudinal sectional view of the power actuator shown in Figure 1.

Referring more particularly to Figure 1 there is shown a portion of an automotive vehicle comprising an engine 10 equipped with a manifold 12 which, during the operation of the engine, forms a source of subatmospheric pressure.

The subatmospheric pressure existing in the manifold is employed to actuate a power cylinder 14 to assist the operator in applying a brake and clutch control pedal 16 pivotally mounted at 18 and extending through the floor-boards 20.

A control valve 22, more particularly described hereinafter, is interposed in a connection, comprising a rod 24, connecting the control pedal 16 with a crank 26, operably connected to a cross shaft 28, which may be connected to actuate the brakes in a known manner when it is desired to employ the device of the present invention to operate the brakes of the vehicle.

If it is desired to actuate the clutch by this mechanism, a crank 27 may be fixed to the pedal 16 to disengage the clutch, represented diagrammatically at 29. When the pedal 16 is depressed the crank 27 is rotated in the counterclockwise direction to compress the spring 31 and permit the separation of the frictional plates of the clutch (shown diagrammatically) in a known manner.

A conduit 30 connects a portion of the valve 22 with the manifold, and another conduit 32 connects the power actuator 14 to another portion of the valve 22, so that the power actuator may be alternately subjected to the subatmospheric pressure existing in the manifold or to atmospheric pressure, depending upon the position of the valve as hereinafter described.

The illustrated valve includes a casing 46 connected to the rod 24, and closed at the front side by a plate 48 with a flexible diaphragm 50 arranged therebetween. A circular ledge 52, separating the manifold and power-device connections 30 and 32, is formed on the valve casing, and normally engages the diaphragm 50, which is held thereagainst by a metal washer 54 or the like urged toward the right by a spring 56.

In this position the manifold connection 30 is shut off by engagement of the diaphragm 50 with the ledge 52, and conduit 32 is in communication with the atmosphere through openings 58 in the diaphragm and in the washer 54, these openings being at all times in communication with openings 60 in plate 48, these latter openings being protected by baffle members 62 secured to plate 48.

If now the pedal 16 is depressed, a two-part threadedly-connected plunger 64, slidable on the shaft connection 66 secured permanently in the casing 46, and connected to the center of diaphragm 50, moves to the left until it engages a stop 68 threaded on connection 66. This movement is sufficient to cause a part 70 on the end of plunger 64 to engage the diaphragm 50 and cut off the connection to the atmosphere, at the same time pushing the diaphragm away from the ledge 52 and establishing a connection between conduit 30 and conduit 32. Thus with the pedal depressed, communication is established between the engine manifold and the conduit 32.

The conduit 32 opens into the single-ended cylinder 90, drawn or stamped from sheet steel, and mounted on a bracket or the like 92 carried by the dashboard 94, facing downwardly. The lower end of the cylinder has a closure 174 provided with air vents protected by baffles 178. A Bowden-type flexible conduit 182 is connected at its upper end to the closure 174, and at its lower end to a fixed bracket 96 adjacent the brake or clutch pedal 16.

Within the cylinder is a power member such as a piston 180 connected to a tension element 186 passing through tubular fitting 184 carried by closure 178, and through the conduit 182, and connected at its lower end to the pedal 16.

The operation of this device is as follows, assuming that the engine is running and that the operator wishes to disengage the clutch, and apply the brakes. He depresses lever 16 thereby disengaging the clutch and at the same time moving the rod 24 to the left as viewed in Figure 1, and by means of the plunger 64 and the connection 66, moving the part 70 of the valve 22 to the left, engaging diaphragm 50 and removing it from circular ledge 52, so that the subatmospheric pressure existing in the manifold 12 may be passed through conduit 30, over circular ledge 52, through conduit 32, to evacuate the cylinder 90 of the power actuator 14. As the cylinder 90 is evacuated, piston 180 moves upwardly as viewed in Figure 3, thereby exerting a pull on tension element 186, and exerting a pull on lever 16, tending to rotate it in the counterclockwise direction as viewed in Figure 1. Continued rotation of the lever 16 causes rotation of the shaft 28 which applies the brakes. The power actuator is thus employed to assist in operating the lever 16. The operator is thus relieved of the greater portion of the physical labor in actuating the clutch. The device is also very convenient and serviceable where it is necessary to hold the control mechanism applied for a considerable length of time, since otherwise the physical effort required to hold the clutch disengaged and the brakes applied is very tiring. The power cylinder 14 has almost sufficient power to operate the clutch but the clutch spring is slightly more powerful than the force supplied by the power cylinder.

This is a continuation-in-part of my copending application, Serial No. 559,987, filed August 28, 1931.

Having thus described the invention what I claim as new and desire to obtain by Letters Patent is:

In a vehicle having a prime mover including a source of vacuum, and a manually operable member, braking means comprising a cross shaft operated by said member, clutch means operated by said member, a linkage interconnecting said member and the cross shaft, power means for assisting the operation of said manually operable member comprising a chamber, a conduit connecting said chamber to said source of vacuum, a valve in said conduit and interposed in said linkage so as to be controlled by said manually operable member, said chamber having a movable wall actuated by differences in vacuum in the chamber, a flexible tension member connecting said movable wall to said manually operable member, and a sheath enclosing said tension member.

VICTOR W. KLIESRATH.